Figure 1:
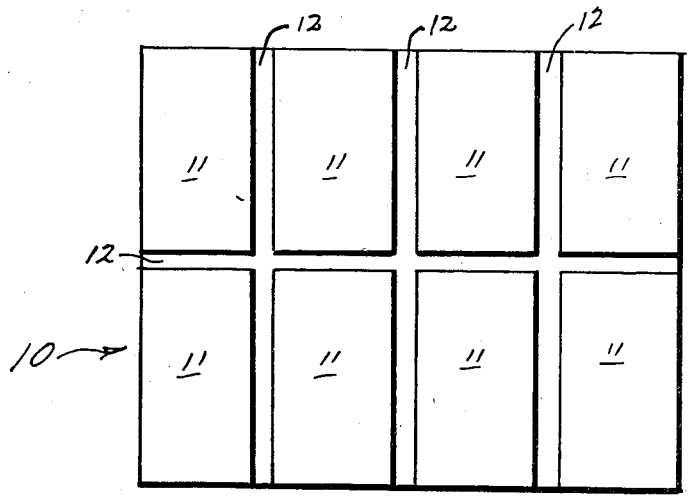

July 22, 1952  G. MARTIN  2,604,407

METHOD OF PRESERVING POPCORN IN SOLID FAT

Filed Nov. 28, 1951

INVENTOR.
Gayle Martin
BY Eugene W. Simpson
Atty.

Patented July 22, 1952

2,604,407

UNITED STATES PATENT OFFICE 2,604,407

METHOD OF PRESERVING POPCORN IN SOLID FAT

Gayle Martin, Milwaukee, Wis., assignor to Popcorn Products Corporation, Milwaukee, Wis., a corporation of Wisconsin Application November 28, 1951, Serial No. 258,587

10 Claims. (Cl. 99—153)

This invention relates to food products and more particularly to the packaging and preservation of popcorn.

This application is a continuation in part of application Serial No. 243,527, filed August 24, 1951, now abandoned.

Popcorn is a food product which requires very careful handling in order to insure large tender kernels when popped.

The term "raw corn" or "raw popcorn" as used hereinafter in this specification shall refer to unpopped popcorn and is to be so understood.

There are in general two ways of popping corn. The first and older method pops the corn dry (without oil or other cooking fats) and requires constant and violent shaking in order to avoid burning. The second and more modern method is to pop the corn in oil or other cooking fats. When the corn is popped in a cooking fat the operation does not require the violent agitation so necessary to successful dry popping.

It has been found, however, that the percentage of oil to corn affects the results obtained. Too little oil results in small kernels when popped as well as many unpopped kernels and considerable burning. Too much oil weakens the shell of the unpopped corn and results in soggy corn and in corn of inferior size and taste.

The correct proportion of oil to corn results in large tender kernels with practically no burning and substantially all kernels being popped. When the proper proportion of oil is used the flavor and aroma are also improved.

Care must also be given to the kind of oil used in connection with the corn. Butter is not desirable due to its low melting and burning points. A vegetable oil having a melting point of 85-95° produces satisfactory popping and adds to the taste and aroma.

It is also a well known fact that unless precautions are taken to preserve the moisture in the raw corn it soon dries out after which no method of popping produces a satisfactory product. The usual method used heretofore of preserving the moisture in the raw corn employs a sealed container which hermetically seals the corn against loss of moisture. This method is expensive in that the container is used only once and must then be thrown away. According to the present invention the raw corn may be preserved indefinitely without the necessity of using hermetically sealed containers.

It is an object of the present invention to provide a method of preserving raw popcorn which will produce large kernels of popped corn.

Another object of the invention is to provide a method of preserving raw popcorn which will insure against the corn drying out prior to popping.

Another object is to provide a method of preserving unpopped popcorn which will reduce the number of unpopped kernels in a batch of popped corn to a minimum.

A further object is to provide a method of packaging popcorn which will preserve the moisture content of the raw corn.

Another object is to provide a method of preserving raw popcorn with cooking fats to reduce the tendency of the corn to burn during popping.

A further object is to provide a method of preserving unpopped popcorn with cooking fats to give superior taste and aroma to the popped corn.

A further object is to provide a method of preserving raw popcorn which will preserve the moisture in the raw corn without the necessity of packaging the mixture in an hermetically sealed container.

A further object is to provide a method of preserving raw corn in cooking fats without weakening the shell of the corn.

A still further object is to provide a method of preserving raw corn with a cooking fat in which the fat is uniformly distributed throughout the corn.

A still further object is to provide a method of preserving raw corn in a cooking fat, which will reduce the cost of packaging.

Still further objects will become apparent upon considering the following specification, which, when considered in conjunction with the accompanying drawings, illustrate a preferred form of the invention.

Figure 2:
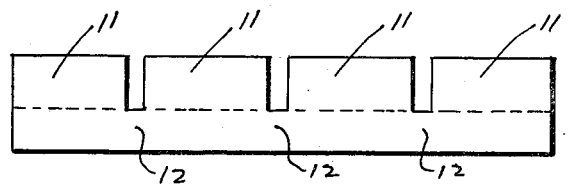

In the drawings:

Fig. 1 is a top plan view of a popcorn cake embedded in cooking fats, and embodying the present invention; and Fig. 2 is a side elevational view of the cake shown in Fig. 1.

In practicing the present invention one method contemplates placing a measured quantity of raw popcorn in a mold and filling the mold with a predetermined quantity of liquefied cooking fat.

The cooking fat preferably comprises a hydrogenated cocoanut oil having a melting point of about 95° F., although other oils having a high melting point and the proper flavor may also be used.

The finished product should contain:

| | Approximate per cent |
|---|---|
| Unpopped corn (by weight) | 72 |
| Cooking fat (by weight) | 28 |

While the percentages have been given as 72% popcorn to 28% fat this proportion may be varied within limits of about 70-75% popcorn and 30-25% fat without materially varying the final product.

The amount of cooking fat used is approximately the amount required to fill the interstices so that, when the oil is cooled to its freezing temperature, the resulting cake of raw corn and cooking fat contains the two ingredients in substantially uniform consistency throughout the cake.

To form the cake, the required amount of raw popcorn is placed in a mold. The cooking fat to be used is melted by heating to 15 to 25 degrees above its melting point so the resulting fat will flow freely. The correct amount of melted cooking fat may then be added to the corn, the fat substantially filling the interstices between the kernels.

Prolonged contact of the corn with any liquid softens the shell of the corn and reduces the size of the popped kernel. The longer the period of time the raw popcorn is in contact with the liquid the greater the damage to the shell. It is therefore desirable to reduce the liquefied cooking fat to solid form in a relatively short period of time. This is accomplished by placing the mixture of popcorn and liquefied cooking fat in a refrigerator so as to cool the fat rapidly. In practice the refrigerator is maintained at about zero degrees Fahrenheit, or lower, in order not only to solidify the liquid fat but to cool the solid fat and form a rigid cake which may be wrapped readily without distorting its shape.

The cooking fat when solidified in the popcorn cake is maintained in solid form until the corn is placed in a pot for popping. To maintain it in solid form the wrapped cake may be kept in an ordinary refrigerator or other cool place.

An alternate means of accomplishing the same result, contemplated by the present invention, is to mix mechanically the proper amount of corn with the proper amount of solidified cooking fat, such as hydrogenated cocoanut oil, until the corn is evenly distributed in the fat and pressing the mixture into a suitable mold. The molded mixture may then be cooled further by refrigeration to harden the cake and the raw popcorn cake removed from the mold and packaged in a suitable wrapper.

If desired, and where the law permits, the cooking fat may be flavored with any desired flavor such as artificial butter flavor, cheese flavor or other flavoring matter.

Since the consistency throughout the cake is substantially uniform in both methods described above, any portion of the cake may be broken off prior to popping and popped independently of the remainder of the cake, with the assurance that perfect popcorn will result.

In order to provide for definite small portions each cake 10, may be divided into eight equal sections 11, as seen in Fig. 1, separated by weakened sections 12, so that the cake may be broken into individual servings, conveniently, on the weakened sections, and any portion be popped at one time.

To the popped corn may be added seasoning to taste.

It will be noted that in both described methods the raw corn is completely encased in fat and hence is hermetically sealed against the escape of moisture from the corn. The corn thus may be kept indefinitely without loss of moisture. Since the fat is in solid form it does not penetrate the husk of the corn and therefore the popcorn when popped is not soggy as is the case when raw corn is packaged in unsolidified oil.

The foregoing description represents merely a preferred form of the invention and various changes in types of cooking fats and raw corn and changes in the size and shape of the popcorn cake as well as limited change in the proportion of raw corn to cooking fat may be resorted to without departing from the spirit of the invention or the scope of the subjoined claims.

That which is claimed as new and is desired to be secured by United States Letters Patent is:

1. The method of preserving raw popcorn which comprises, placing the raw popcorn in a mold and pouring in sufficient liquefied normally solid vegetable cooking fat to fill the interstices.

2. The method of preserving raw popcorn which comprises, placing the raw popcorn in a mold and pouring in sufficient liquefied normally solid hydrogenated cooking fat to fill the interstices.

3. The method of preserving raw popcorn which comprises, placing popcorn in a mold and pouring in sufficient liquefied hydrogenated cocoanut oil to fill the interstices.

4. The method of preserving raw popcorn which comprises, mixing 70 to 75 per cent raw popcorn with 25 to 30 per cent solid vegetable cooking fat and forming the mixture into cakes of the desired size.

5. The method of preserving raw popcorn which comprises, mixing the raw popcorn in the ratio of approximately 70 to 75 per cent popcorn with 25 to 30 per cent of hydrogenated cocoanut oil and forming the mixture into cakes of the desired size.

6. The method of preserving raw popcorn which comprises, placing raw popcorn in a mold, pouring in sufficient warm hydrogenated cocoanut oil to fill the interstices, and cooling to solidify the oil.

7. The method of preserving raw popcorn which comprises, forming a mixture of approximately 70 to 75 per cent raw popcorn and 25 to 30 per cent vegetable cooking fat, cooling to solidify the fat and retaining the fat in solid form.

8. The method of preserving raw popcorn which comprises, forming a mixture of 70 to 75 per cent raw popcorn and 25 to 30 per cent hydrogenated cocoanut oil having a melting point of approximately 95° F., forming the mixture into cakes and cooling the mixture to solidify the cakes.

9. The method of preserving raw popcorn which comprises, placing the raw popcorn in a mold, pouring in sufficient liquid hydrogenated which comprises, forming a cake comprising approximately 75 per cent raw popcorn and 25 cocoanut oil having a melting point of approximately 95° F. to fill the interstices, and cooling the resultant mixture to solidify the oil.

10. The method of preserving raw popcorn per cent hydrogenated cocoanut oil having a melting point of approximately 95° F. and packaging.

GAYLE MARTIN.

REFERENCES CITED

The following references are of record in the file of this patent:

UNITED STATES PATENTS

| Number | Name | Date |
| --- | --- | --- |
| 2,170,155 | Musher | Aug. 22, 1939 |
| 2,518,247 | Nairn | Aug. 8, 1950 |

OTHER REFERENCES

Richmond, W. L., Candy Production: Methods and Formulas. Pub. by the Manufacturing Confectioner, Chicago, Ill., 1948, pages 558 to 561.